United States Patent
Zenzen

(10) Patent No.: US 10,067,003 B2
(45) Date of Patent: Sep. 4, 2018

(54) METHOD AND DEVICE FOR DETERMINING A SURFACE TEMPERATURE OF AN INDUCTIVELY HEATED ROLLER SHELL

(71) Applicant: Oerlikon Textile GmbH & Co. KG, Remscheid (DE)

(72) Inventor: Dirk Zenzen, Leverkusen (DE)

(73) Assignee: Oerlikon Textile GmbH & Co. KG, Remscheid (DE)

( * ) Notice: Subject to any disclaimer, the term of this patent is extended or adjusted under 35 U.S.C. 154(b) by 316 days.

(21) Appl. No.: 14/889,967

(22) PCT Filed: May 2, 2014

(86) PCT No.: PCT/EP2014/059010
§ 371 (c)(1),
(2) Date: Nov. 9, 2015

(87) PCT Pub. No.: WO2014/180750
PCT Pub. Date: Nov. 13, 2014

(65) Prior Publication Data
US 2016/0169751 A1 Jun. 16, 2016

(30) Foreign Application Priority Data
May 10, 2013 (DE) .................. 10 2013 008 068

(51) Int. Cl.
*G01K 7/00* (2006.01)
*G01K 7/36* (2006.01)
(Continued)

(52) U.S. Cl.
CPC .............. *G01K 7/36* (2013.01); *G01K 7/42* (2013.01); *G05D 23/2401* (2013.01); *H05B 6/06* (2013.01); *H05B 2206/022* (2013.01)

(58) Field of Classification Search
CPC combination set(s) only.
See application file for complete search history.

(56) References Cited

U.S. PATENT DOCUMENTS 4,460,869 A * 7/1984 Buser ................ G01K 7/36
324/200
6,423,953 B1 * 7/2002 Johnson, Jr. ........ B29C 65/3616
219/634

(Continued)

FOREIGN PATENT DOCUMENTS

| CH | 527934 A | 9/1972 |
|---|---|---|
| DE | 19730531 C1 | 9/1998 |

(Continued)

Primary Examiner — Lisa Caputo
Assistant Examiner — Nasir U Ahmed
(74) Attorney, Agent, or Firm — BainwoodHuang

(57) ABSTRACT

A method and a device determine a surface temperature of an inductively heated roller shell. A current is induced in the roller shell by an induction coil. An actual value of the surface temperature is determined from at least one measured parameter of an electrical circuit of the induction coil by means of stored data. In order to be able to determine shell temperatures of the roller shell that are as exact as possible without large dispersion, the induction coil is connected to a capacitor in the electrical circuit in order to form an oscillating circuit, wherein the oscillating circuit is operated at an alternating-voltage frequency in the range of 3000 Hz to 30,000 Hz.

14 Claims, 4 Drawing Sheets

Figure 1:
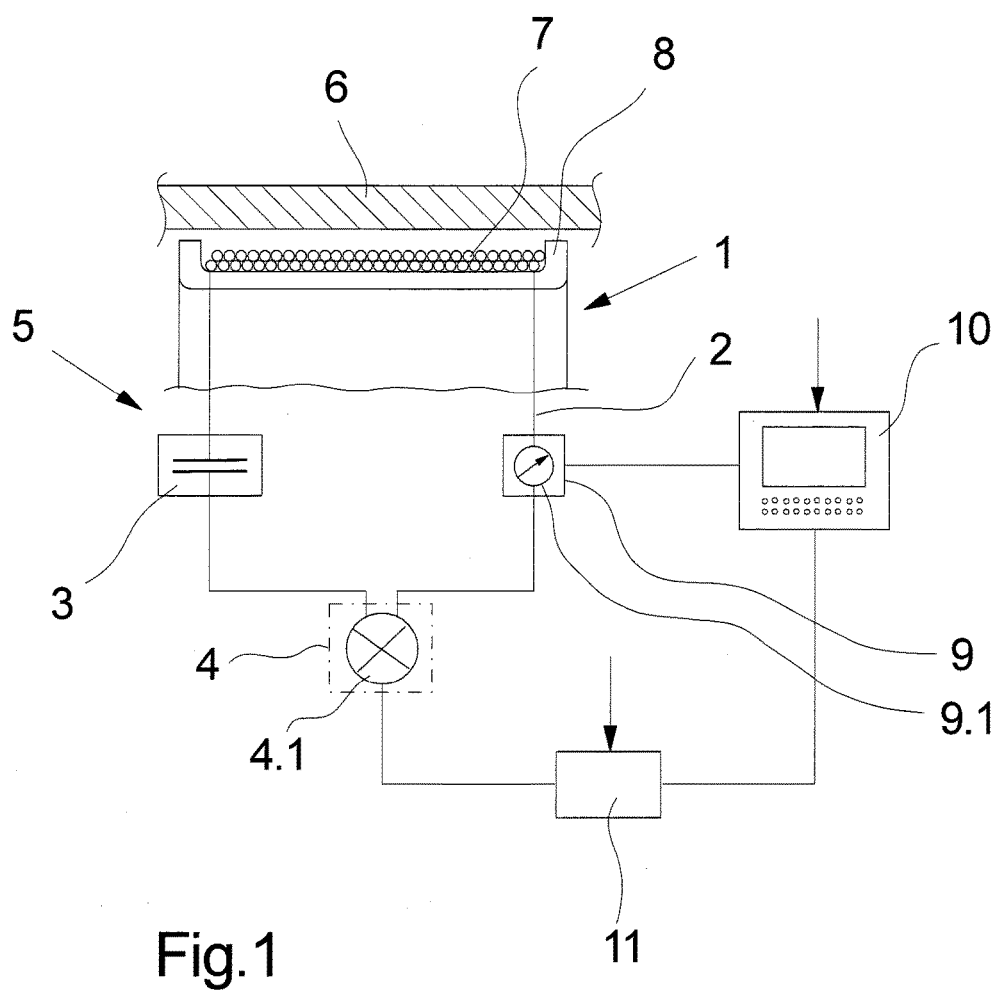

(51) Int. Cl.
    *H05B 6/06*    (2006.01)
    *G01K 7/42*    (2006.01)
    *G05D 23/24*   (2006.01)

(56) References Cited

U.S. PATENT DOCUMENTS

| | | | | |
|---|---|---|---|---|
| 7,102,108 B2* | 9/2006 | Kikuchi | ............ | G03G 15/2042 |
| | | | | 219/619 |
| 2005/0283330 A1* | 12/2005 | Laraia | .................... | G01C 25/00 |
| | | | | 702/104 |
| 2006/0056488 A1* | 3/2006 | Surname | .................. | G01K 7/32 |
| | | | | 374/184 |
| 2009/0140735 A1* | 6/2009 | Chen | .................... | G01R 33/383 |
| | | | | 324/307 |
| 2010/0231213 A1* | 9/2010 | Nieuwenhuis | ......... | B82Y 25/00 |
| | | | | 324/252 |
| 2011/0222889 A1* | 9/2011 | Tabuchi | ............. | G03G 15/2078 |
| | | | | 399/69 |
| 2012/0199579 A1* | 8/2012 | Pateau | .................... | H05B 6/06 |
| | | | | 219/672 |

FOREIGN PATENT DOCUMENTS

| | | |
|---|---|---|
| DE | 19843990 C1 | 8/1999 |
| DE | 102010051559 A1 | 3/2012 |
| EP | 0892585 A2 | 1/1999 |
| EP | 1302818 A1 | 4/2003 |
| WO | 8501532 A1 | 4/1985 |

\* cited by examiner

METHOD AND DEVICE FOR DETERMINING A SURFACE TEMPERATURE OF AN INDUCTIVELY HEATED ROLLER SHELL

The invention relates to a method for determining a surface temperature of an inductively heated roller shell and to a device for determining a surface temperature of an inductively heated roller shell.

A generic method and generic device are known from EP 0 892 585 A2.

During the production of fibers or threads, for the guidance and in particular for the heat treatment of the threads, it is generally known to use rollers or godets which have a heated roller shell, on the surface of which the fibers or threads are guided. During such production processes, the maintenance of predetermined surface temperatures on the roller shell is particularly important, in order to obtain the desired physical characteristics on the fibers and the threads. To this extent, it is also known to monitor the surface temperature of the roller shell. Here, the monitoring is preferably carried out by temperature sensors. However, such methods and devices for determining a surface temperature basically have the disadvantage of the signal transmission which has to take place between the rotating roller shell and stationary equipment. Such methods and devices are therefore not the subject of this invention.

EP 0 892 585 A2 discloses a method and a device for determining a surface temperature of an inductively heated roller shell in which the surface temperature is determined without using a sensor. For this purpose, use is made of an induction coil which induces a short-circuit current in the roller shell. Since the roller shell, formed from a metallic material, has an electrical conductivity that depends on temperature, the measured values of a current and a voltage of the coil permit the associated temperature of the roller shell to be determined.

In the known method and the known device, the induction coil is operated with mains voltage. In this case, the induction coil generates a magnetic field which propagates in all directions. To this extent, the surrounding area of the roller shell, such as in particular the roller support, end walls or drive shafts, are also included, so that the currents induced in the surroundings likewise lead to heating of these parts. In addition, these temperatures of the adjacent equipment influence the current and the voltage in the coil winding. Such secondary effects lead to the surface temperature of the roller shell being determined only with low accuracy.

It is, then, an object of the invention to develop a method and a device for determining a surface temperature of an inductively heated roller shell of the generic type in such a way that the surface temperature of the roller shell can be determined without contact with the highest possible accuracy.

According to the invention, this object is achieved for a method in that the coil in the circuit is connected to a capacitor to form an oscillating circuit, and that the oscillating circuit is operated with an alternating voltage frequency in the range from 3000 Hz to 30,000 Hz.

For a device, the inventive solution lies in the fact that the induction coil in the circuit is connected to a capacitor to form an oscillating circuit and that the voltage source for supplying the circuit has a voltage module which generates an alternating voltage with a frequency in the range from 3000 Hz to 30,000 Hz.

Advantageous developments of the invention are defined by the features and feature combinations disclosed herein.

The invention is distinguished by the fact that the induction coil connected in the oscillating circuit is able to generate a magnetic field concentrated on the roller shell. The alternating voltage frequency in the range from 3000 Hz to 30,000 Hz promotes the effect of current displacement, so that the field lines of the magnetic field are concentrated directly in a shell zone of the roller shell which encloses the induction coil. Heating of the surrounding regions can be avoided thereby. To this extent, the parameters that can be measured on the induction coil are influenced exclusively by the shell temperature of the roller shell. There is thus the possibility of determining the surface temperature of the roller shell with very high accuracy solely from the characteristic measured values of the temperature-dependent parameters of the oscillating circuits.

During heating of the roller shell, the electrical conductivity of the roller shell changes. In the case of rising temperature, the electrical conductivity of the roller shell decreases. Therefore, the effective resistance of the roller shell increases. Thus, in principle it is possible to use the magnetic and electric parameters of the induction coil which are influenced by the electrical conductivity and by the effective resistance of the roller shell. So, according to an advantageous development of the invention, the parameter that can be measured is an inductance of the induction coil in an operating phase of the oscillating circuit or in a quiescent phase of the oscillating circuit. Since the penetration depth, which depends on the effective resistance and the conductivity, has a critical influence on the inductance of the magnetic circuit, conclusions about the respective surface temperature can be derived directly from the measured value of the inductance. The measurement of the inductance can be carried out both during an operating phase of the oscillating circuit or in a quiescent phase of the oscillating circuit. The operating phase of the oscillating circuit is the state in which the voltage source is activated. In the quiescent phase of the oscillating circuit, on the other hand, the voltage source is switched off. Depending on the state, appropriate measuring means for measuring an inductance of the induction coil must be selected.

In principle, a series of physical parameters are suitable to determine an actual value of the surface temperature from the measurement of a parameter of the circuit and stored data. For example, the parameter that could be measures is a phase angle between current and voltage in the oscillating circuit. Likewise, the ratios between the amplitudes of the excitation voltage and the capacitor voltage but also the amplitudes of the excitation voltage and the coil voltage are influenced by temperature, so that these amplitude ratios also permit conclusions about the surface temperature. Furthermore, determinations of the field strength in the air gap in relation to an excitation voltage also permit temperature determinations.

A particularly preferred variant, however, is represented by the development of the invention in which the parameter that is measured is a current and a voltage of the oscillating circuit in an operating phase of the oscillating circuit.

To this end, the device according to the invention has a current measuring apparatus for measuring a current and a voltage measuring apparatus for measuring voltage, which are assigned to the oscillating circuit. Thus, it has been shown that the ratio between the voltage and current of the oscillating circuit exhibits a relatively high temperature dependence.

In order to obtain unambiguous measured results leading back to a surface temperature within the operating phase of the oscillating circuit, according to a preferred method variant the current and the voltage of the oscillating circuit are measured following the expiry of a transient phase of the oscillating circuit, wherein an effective value of the current and an effective value of the voltage being determined during a measuring phase. The measuring phase is usually determined in such a way that both at the start and the end it is associated with a defined zero crossing of the voltage.

In order to establish the operating phases and the quiescent phases of the oscillating circuit, according to a development of the device according to the invention the voltage module for activating and deactivating the oscillating circuit is coupled to a control apparatus. Thus, the operating phases and measuring phases can be coordinated with one another.

It has proven to be particularly advantageous that the induction coil provided for the temperature measurement advantageously simultaneously heats the relevant region of the roller shell. To this extent, the method variant in which the induction coil is used as a heating coil for heating the roller shell is particularly advantageous.

For this purpose, the device according to the invention has formed the induction coil as a heating coil, which is held on a coil holder at a short distance from the roller shell.

Thus, according to a development of the invention, the control of the heating coil can advantageously be combined with the determination of the actual value of the surface temperature.

According to an advantageous development of the device according to the invention, the control apparatus is connected to the evaluation apparatus, wherein the control apparatus or the evaluation apparatus has a comparator for comparing surface temperatures of the roller shell. Therefore, a continuous comparison between an actual value of the surface temperature and an intended value of the surface temperature is possible, so that, in the event of impermissible deviations, activation or deactivation of the voltage module can be carried out.

In order to implement the desired frequencies in the range from 3000 Hz to 30,000 Hz in the oscillating circuit, the induction coil preferably has a number of windings in the range from 10 to 50. The concentration of the field lines can be improved still further thereby.

Figure 2:
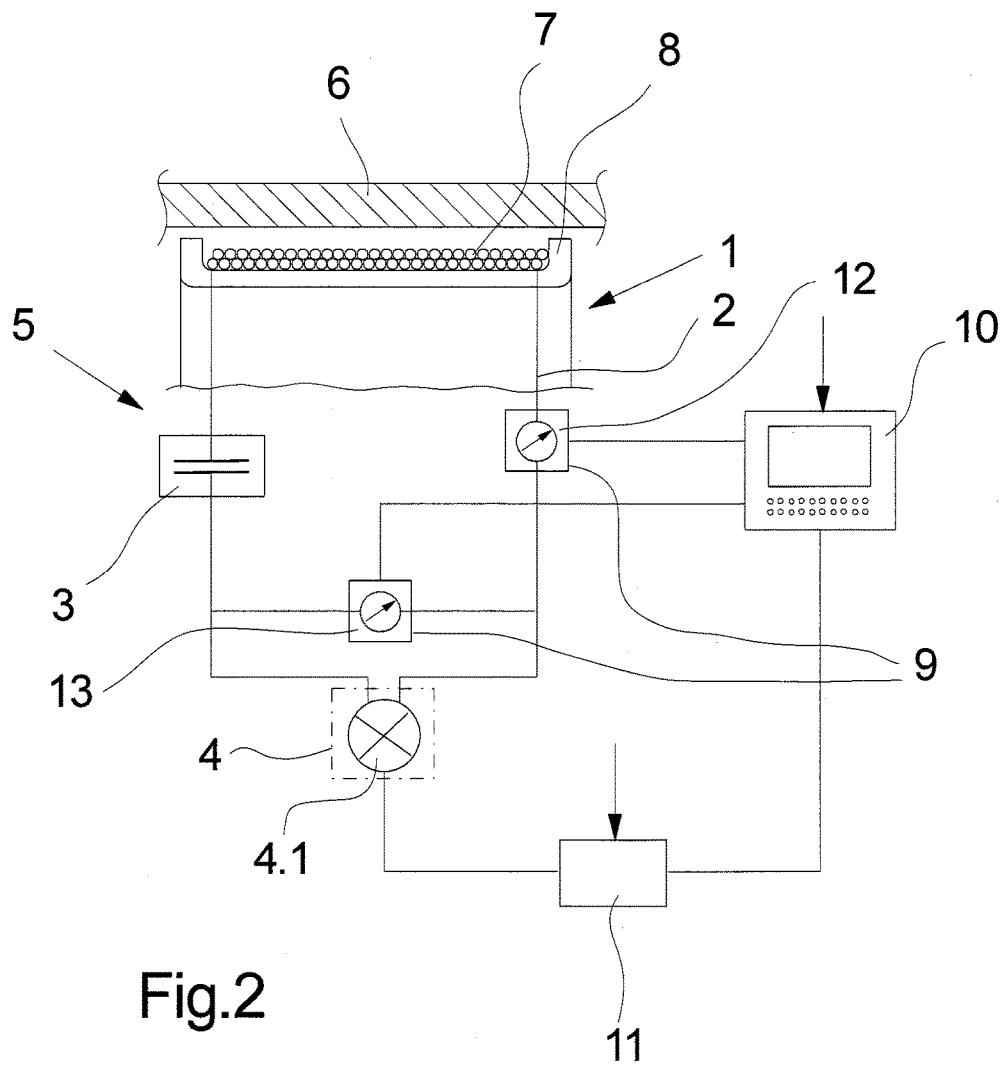
Figure 3:
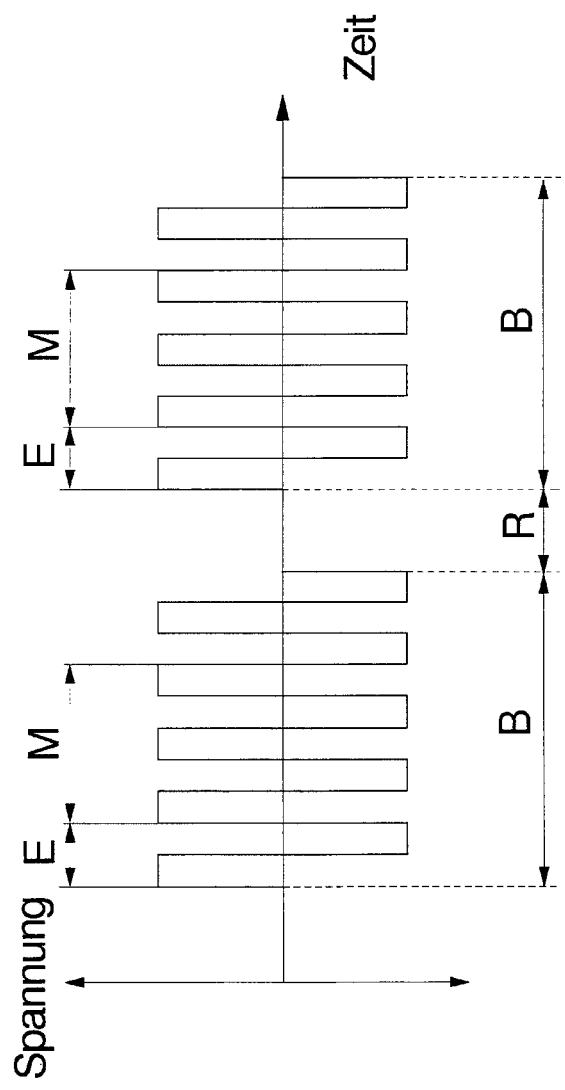

In order to explain further the method according to the invention and the device according to the invention for determining a surface temperature of an inductively heated roller shell, some exemplary embodiments of the device according to the invention will be explained in more detail by using the appended FIGURES, in which:

FIG. 1 shows, schematically, a first exemplary embodiment of the device according to the invention for determining a surface temperature of an inductively heated roller shell FIG. 2 shows, schematically, a further exemplary embodiment of the device according to the invention for determining a surface temperature of an inductively heated roller shell FIG. 3 shows, schematically, a voltage curve of a voltage module of the exemplary embodiment according to FIG. 1 or 2

Figure 4:
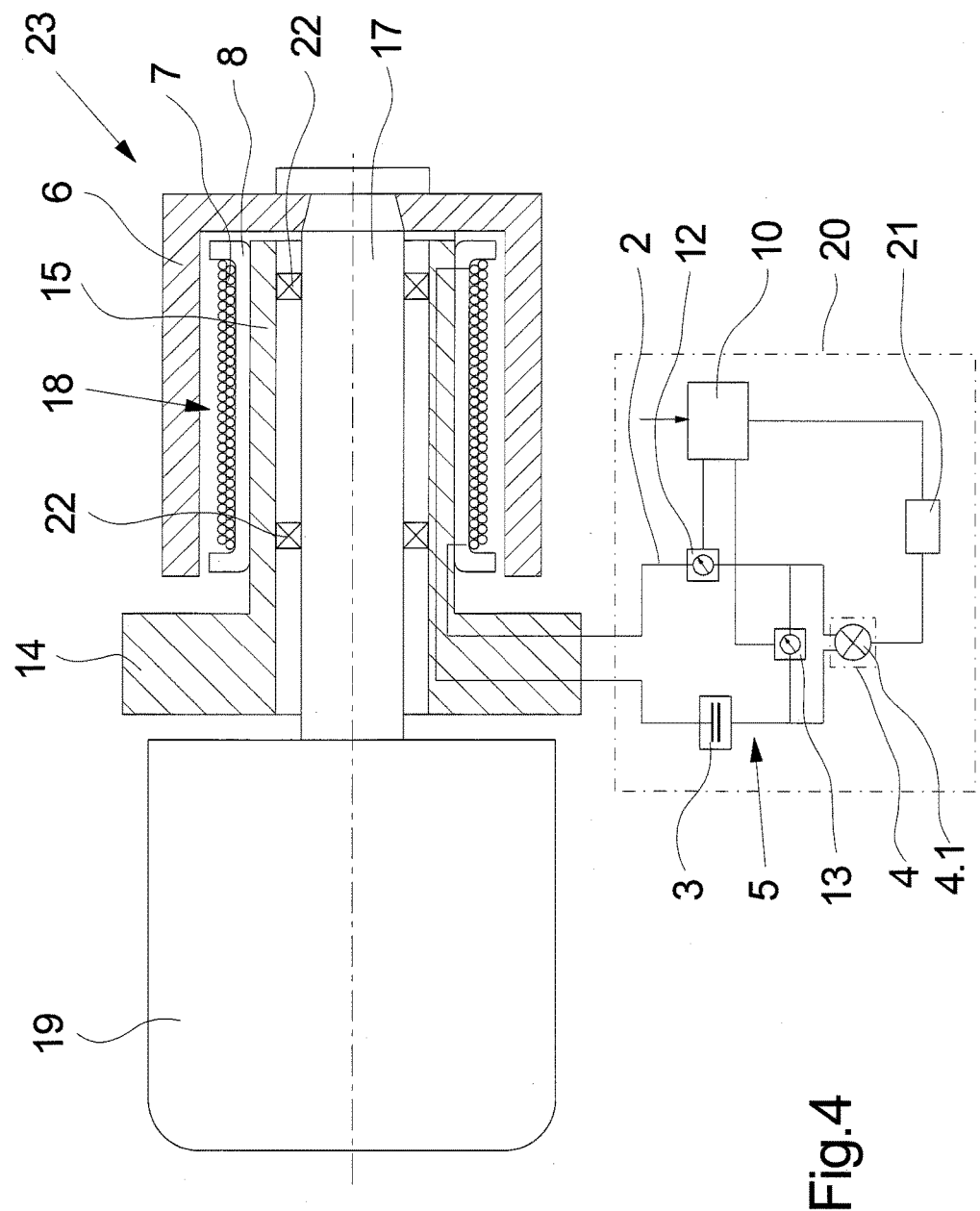

FIG. 4 shows, schematically, a device according to the invention for determining a surface temperature of an inductively heated roller shell, integrated in a godet.

In FIG. 1 a first exemplary embodiment of the device according to the invention for determining a surface temperature of an inductively heated roller shell is illustrated schematically. The roller shell 6 is shown in part and encloses an induction coil 1 assigned to the roller shell 6 concentrically at a short distance. The induction coil 1 in this exemplary embodiment is shown schematically by a coil frame 8 and a relatively large number of windings 7.

The induction coil 1 is connected to a capacitor 3 and a voltage source 4 in a circuit 2 to form an oscillating circuit 5. The voltage source 4 is coupled to a control device 11, by means of which a voltage module 4.1 of the voltage source 4 is activated or deactivated.

The oscillating circuit 5 is assigned a measuring device 9 having a measuring means 9.1. In the oscillating circuit 5, a parameter of the oscillating circuit 5 is measured by a measuring means 9.1 and fed to an evaluation apparatus 10 which is connected to the measuring means 9.1. In this exemplary embodiment, the measuring means 9.1 is formed in such a way as to measure an inductance of the induction coil 1.

In an operating phase, which can be established on the voltage module 4.1 via the control device 11, an alternating voltage having a voltage frequency in a range from 3000 Hz to 30,000 Hz is generated via the voltage module 4.1. As a result, continuously repeated charging and discharging of the capacitor 3 take place in the oscillating circuit 5, which implements repeated magnetization of the roller shell 6 by the induction coil 1 and induces a current.

In this operating phase, the inductance of the induction coil 1 is measured by the measuring means 9.1 and fed to the evaluation apparatus 10. The measured signals are evaluated within the evaluation apparatus 10 in accordance with predefined algorithms and combined with stored data in order to obtain an actual value of the surface temperature of the roller shell 6. For this purpose, the evaluation apparatus 10 preferably has a visualization device or an output unit. After a measurement has been carried out, the voltage module 4.1 of the voltage source 4 can be deactivated via the evaluation apparatus 10 and the control device 11, so that the oscillating circuit 5 is transferred into a quiescent phase.

Depending on the selection of the measuring device 9, there is alternatively also the possibility of measuring the inductance of the induction coil 1 during the quiescent phase of the oscillating circuit 5. In this case, measuring currents are used in order to obtain corresponding temperature-dependent measured values of the inductance.

In principle, other parameters of the oscillating circuit can also be measured in order to determine the temperature in the roller shell. Here, it is important that there is coupling between the roller shell and the induction coil connected in the oscillating circuit. The parameters which in particular are influenced by the temperature-dependent conductivity of the roller shell or by the temperature-dependent permeability of the roller shell are particularly suitable to determine the respective temperature of the roller shell. In addition to the inductance, the phase angle between the current and voltage in the oscillating circuit, an amplitude ratio between the excitation voltage and the capacitor voltage, an amplitude ratio of the excitation voltage and the coil voltage or else the field strength in the air gap in relation to the excitation voltage are suitable as parameters.

Irrespective of which parameters are selected as measured values for determining the temperature, feeding the oscillating circuit with a voltage frequency in the range from 3000 Hz to 30,000 Hz is required. Here, the level of the voltage frequency acts directly on the concentration of the field lines of the magnetic field in the roller shell. To this extent, high voltage frequencies are particularly suitable to obtain a pronounced effect of the current extension, so that the magnetic field lines are concentrated directly in the shell zone of the roller shell. Thus, magnetic field scattering and external influences on the oscillating circuit can advantageously be avoided.

In order if possible to obtain an actual value of the surface temperature of the roller shell by using simple algorithms, a further exemplary embodiment of the device according to the invention is illustrated schematically in FIG. 2. The exemplary embodiment according to FIG. 2 is substantially identical to the exemplary embodiment according to FIG. 1; in this exemplary embodiment the measuring device 9 has a current measuring apparatus 12 and a voltage measuring apparatus 13. The current measuring apparatus 12 and the voltage measuring apparatus 13 are assigned to the oscillating circuit 5 in order to obtain an effective value of the current in the circuit 2 and an effective value of the voltage. The current measuring apparatus 12 and the voltage measuring apparatus 13 are connected to the evaluation apparatus 10. Within the evaluation apparatus 10, a quotient is formed from the effective voltage and the effective current. With the aid of stored calibration curves, a corresponding actual value of the surface temperature of the roller shell can be determined directly from the value of the quotient. Calibration curves of this type are usually pre-determined and stored in the evaluation apparatus 10. The measurement of the current and of the voltage in the oscillating circuit 5 is carried out in an operating phase of the oscillating circuit 5. In this phase, the voltage module 4 is activated via the control device 11.

FIG. 3 shows, schematically, the curve of the voltage which is generated by the voltage module 4. Here, two successive operating phases for carrying out a measurement are illustrated on the abscissa. The operating phase is identified by the code letter B, and a quiescent phase prevailing between the operating phases is identified by the code letter R. In order to carry out the measurement in the oscillating circuit 5, first of all a transient phase at the start of the operating phase is waited for. To this extent, the measuring phase is not identical with the time period of the operating phase. In FIG. 3 the transient phase is identified by the code letter E and the measuring phase by the code letter M. It is important here that the start of the measuring phase and the end of the measuring phase are each associated with a zero crossing of the voltage, which in particular benefits the effective value determination.

In the exemplary embodiments illustrated in FIGS. 1 and 2, the induction coil 1 in the oscillating circuit 5 is used solely for determining the surface temperature of the roller shell 6. For this purpose, the induction coil 1 has at least 10 to at most 50 windings 7. An advantageous concentration of the field lines of the induction coil 1 can be achieved thereby.

In principle, however, there is also the possibility of forming the induction coil 1 directly as a heating coil and thus simultaneously heating the roller shell 6 in parallel. FIG. 4 shows an exemplary embodiment of a godet which has a rotating roller shell 6. The device according to the invention is integrated in the godet 23. For this purpose, a cross-sectional view of a godet 23 is shown schematically in FIG. 4.

The godet 23 has a bearing carrier 14 with a projecting coil holder 15. The bearing carrier 14 and the coil holder 15 are formed hollow-cylindrically. Within the bearing carrier 14 and the coil holder 15, a drive shaft 17 is rotatably mounted via a plurality of bearings 22. The drive shaft 17 passes through the bearing carrier 14 and the coil holder 15 and is connected to a motor 19 at a drive end. At an opposite end, the drive shaft 17 is coupled to a pot-shaped roller shell 6.

A heating coil 18 is held on the circumference of the projecting coil holder 15. The heating coil 18 is arranged concentrically with respect to the roller shell 6, which is guided at a short distance from the heating coil 18. The heating coil 18 is formed from a coil frame 8 and a multiplicity of windings 7. The windings 7 of the heating coil 18 are coupled to a heating control unit 20 outside the godet 23. The heating control unit 20 has the capacitor 3 connected to the heating coil 18 to form an oscillating circuit 5, and a voltage module 4.1. The heating coil 18 and the capacitor 3 are connected to form a series oscillating circuit 5. Integrated into the circuit 2 is a current measuring apparatus 12, which is connected to an evaluation apparatus 10. Likewise, the series oscillating circuit 5 is assigned a voltage measuring apparatus 13, which is likewise coupled to the evaluation apparatus 10. The evaluation apparatus 10 is connected to a control apparatus 21, which is coupled to voltage module 4.1 of the voltage source 4.

In the exemplary embodiment illustrated in FIG. 4 the voltage module 4.1 is activated via the control apparatus 21, so that a current is induced in the rotating roller shell 6 via the series oscillating circuit 5 and the heating coil 18. The induced current on the roller shell 6 leads to heating of the roller shell 6.

The current and the voltage of the series oscillating circuit 5 are measured continuously in parallel via the current measuring apparatus 12 and via the voltage measuring apparatus 13 and are fed to the evaluation apparatus 10. Within the evaluation apparatus 10, a quotient is formed between the effective value of the voltage and the effective value of the current and is transformed into an actual temperature of the godet shell. For this purpose, one or more calibration curves are usually stored. The determined actual value of the surface temperature of the roller shell 6 is subsequently compared with an intended value of the surface temperature. For this purpose, a comparator, not shown here, is provided and could be integrated into the evaluation apparatus 10 or the control apparatus 21.

For the case in which the actual value of the surface temperature still lies below the intended value of the surface temperature of the roller shell 6, an appropriate signal is output via the evaluation apparatus 10 of the control apparatus 21, so that the control apparatus 21 keeps the voltage module 4.1 activated further. For the case in which the comparator is integrated within the control apparatus 21, a control signal is generated directly in the control apparatus 21.

As soon as the actual value of the surface temperature of the roller shell has reached or exceeded the intended value of the surface temperature of the roller shell, the voltage module 4.1 is deactivated via the control apparatus 21. Then, no more active heating of the roller shell 6 by the heating coil 18 takes place.

In order to be able to carry out continuous temperature monitoring of the roller shell, short measuring phases are produced after predetermined time intervals via a stored control program. For this purpose, the voltage module 4.1 is activated via the control apparatus 21, so that the current and the voltage of the oscillating circuit 5 can be measured. For the case in which the surface temperature of the roller shell 6 cools down to an impermissible value, a heating phase of the heating coil 18 is initiated.

In the godet 23 illustrated in FIG. 4, only one heating coil 18 is assigned to the roller shell 6. In principle, there is also the possibility for roller shells 6 that project over a long distance to be heated by a plurality of heating coils beside one another. In this case, there is a possibility that each heating coil according to the invention is also used for temperature determination. Alternatively, however, the measurement and evaluation could be carried out only with the aid of one of the heating coils.

LIST OF REFERENCE SIGNS

1 Induction coil
2 Circuit
3 Capacitor
4 Voltage source
4.1 Voltage module
5 Oscillating circuit
6 Roller shell
7 Windings
8 Coil frame
9 Measuring device
9.1 Measuring means
10 Evaluation apparatus
11 Control device
12 Current measuring apparatus
13 Voltage measuring apparatus
14 Bearing carrier
15 Coil holder
17 Drive shaft
18 Heating coil
19 Motor
20 Heating control unit
21 Control apparatus
22 Bearing
23 Godet

The invention claimed is:

1. A method of determining a surface temperature of an inductively heated roller shell, comprising:
measuring at least one electric parameter of an oscillating circuit in an operating phase or a quiescent phase of the oscillating circuit, the oscillating circuit being configured with an induction coil and a capacitor for inducing a current in the inductively heated roller shell, the oscillating circuit operating with an alternating voltage frequency in a range from 3,000 Hz to 30,000 Hz; and
determining an actual value of the surface temperature based on the measured at least one electric parameter of the oscillating circuit and stored reference data.

2. The method as claimed in claim 1, wherein the at least one electric parameter that is measured is an inductance of the induction coil in the operating phase of the oscillating circuit or the quiescent phase of the oscillating circuit.

3. The method as claimed in claim 1, wherein the at least one electric parameter that is measured is a current and a voltage of the oscillating circuit in the operating phase of the oscillating circuit.

4. The method as claimed in claim 3, wherein measuring the at least one electric parameter includes measuring the current and the voltage of the oscillating circuit following an expiry of a transient phase of the oscillating circuit, and determining an effective value of the current and an effective value of the voltage during a measuring phase.

5. The method as claimed in claim 1, further comprising:
using the induction coil as a heating coil for heating the inductively heated roller shell.

6. The method as claimed in claim 5, further comprising:
using the actual value of the surface temperature to control the heating coil.

7. A device for determining a surface temperature of an inductively heated roller shell, comprising:
a measuring device for measuring at least one electric parameter of an oscillating circuit in an operating phase or a quiescent phase of the oscillating circuit, the oscillating circuit being configured with at least one induction coil and a capacitor for inducing a current in the inductively heated roller shell, the oscillating circuit being further configured with a voltage module for generating an alternating voltage with a frequency in a range from 3,000 Hz to 30,000 Hz; and
an evaluation apparatus for determining an actual value of the surface temperature based on the measured at least one electric parameter of the oscillating circuit and stored reference data.

8. The device as claimed in claim 7, wherein the measuring device has a measuring means for measuring an inductance of the induction coil.

9. The device as claimed in claim 7, wherein the measuring device has a current measuring apparatus for measuring a current of the oscillating circuit, and a voltage measuring apparatus for measuring a voltage of the oscillating circuit.

10. The device as claimed in claim 7, wherein the voltage module of the oscillating circuit is coupled to a control apparatus, and wherein the control apparatus is configured to activate and deactivate the voltage module.

11. The device as claimed in claim 10, wherein the device is integrated into a qodet, wherein the godet includes a coil holder, and wherein the induction coil is formed as a heating coil that is held on the coil holder at a short distance from the inductively heated roller shell.

12. The device as claimed in claim 11, wherein the control apparatus is connected to the evaluation apparatus, and wherein a comparator is integrated into the control apparatus or the evaluation apparatus to provide an actual-intended comparison of surface temperatures of the inductively heated roller shell.

13. The device as claimed in claim 7, wherein the induction coil has a number of windings in a range from 10 to 50.

14. A method of determining a surface temperature of an inductively heated roller shell, comprising:
inducing a current in the inductively heated roller shell by an oscillating circuit, the oscillating circuit being configured with at least one induction coil and a capacitor for inducing the current in the inductively heated roller shell, the oscillating circuit operating with an alternating voltage frequency in a range from 3,000 Hz to 30,000 Hz;
measuring at least one electric parameter of the oscillating circuit in an operating phase or a quiescent phase of the oscillating circuit; and
determining an actual value of the surface temperature based on the measured at least one electric parameter of the oscillating circuit and stored reference data.

* * * * *